April 1, 1969  A. W. WIETERS  3,435,791
ROLL TYPE DUCT CRIMPER
Filed Aug. 10, 1966
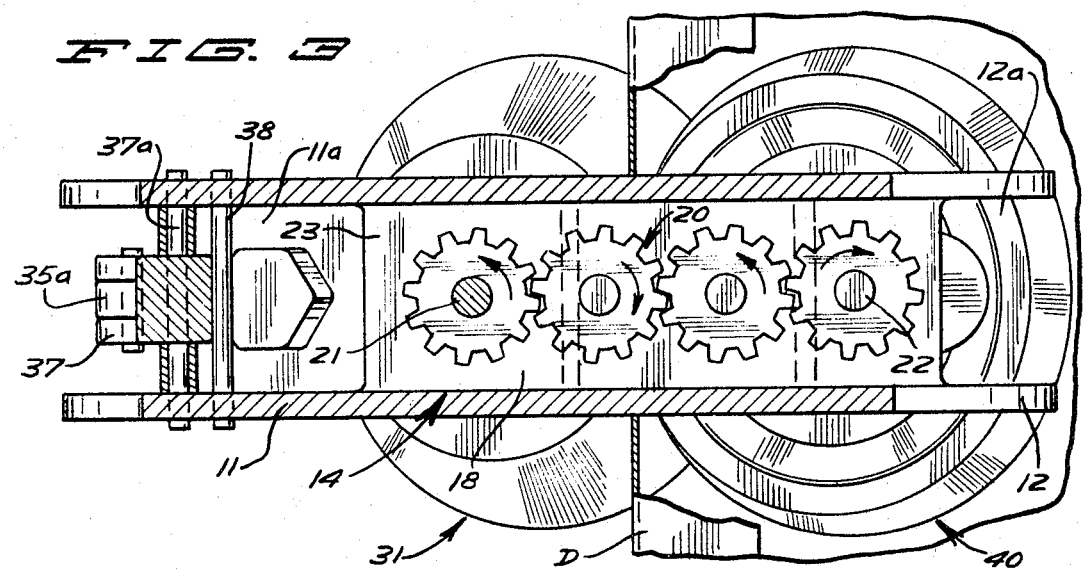
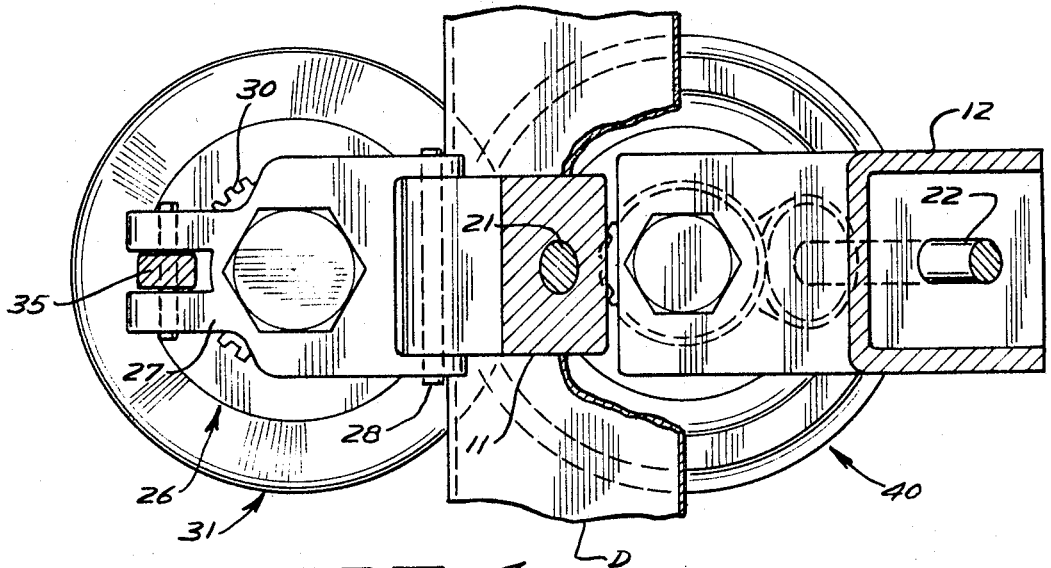
INVENTOR.
ALBERT W. WIETERS
BY
Adams & Cwayna
ATTORNEYS

United States Patent Office 3,435,791
Patented Apr. 1, 1969

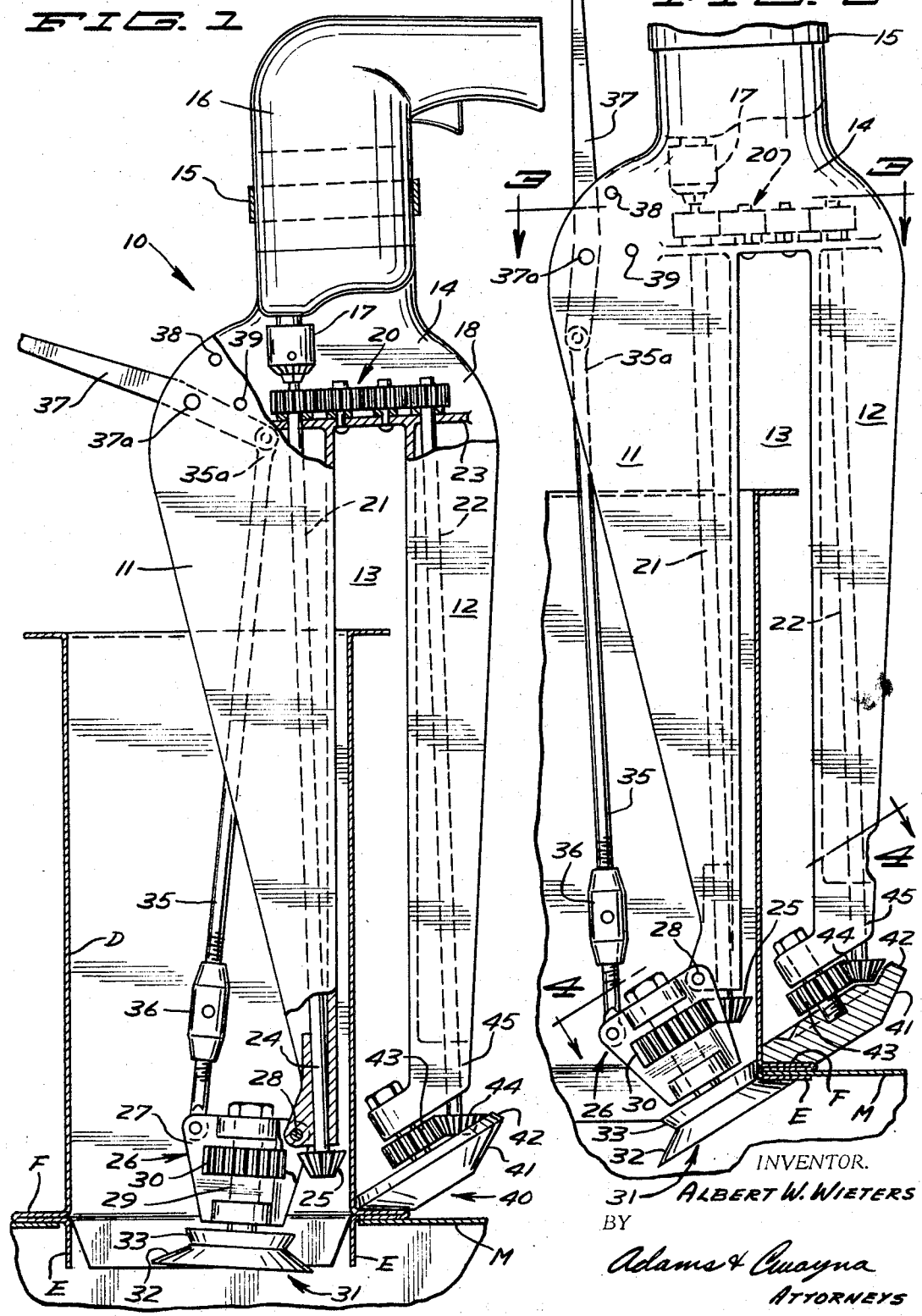

3,435,791
ROLL TYPE DUCT CRIMPER
Albert W. Wieters, 7438 Baker Ave. NE., Fridley Terrace,
Minneapolis, Minn. 55432
Filed Aug. 10, 1966, Ser. No. 571,559
Int. Cl. B21d 19/04
U.S. Cl. 113—58                                         7 Claims

ABSTRACT OF THE DISCLOSURE

This disclosure relates to a tool for installing duct work and includes a pair of parallely arranged arms extending downwardly to a crimping and rolling section which includes driven formed roller members for bending portion of duct work and thereafter driving the rollers to complete the bend over the connected section. Drive means are provided for the unit and positioning means are provided to position one of the formed roller members.

---

In installing duct work a main duct is provided with a plurality of smaller feeder ducts extending laterally therefrom for serving individual areas. Installation of these feeder ducts has long been a problem and has been up to this time accomplished only through hand operations.

The device provided by applicant herein eliminates the difficult hand work involved in this feeder duct installation and permits tapping ducts to be installed positively and securely into the main duct by crimping a portion of the feeder duct against the side wall of the main duct through a roll form process. This roll form process is, as disclosed herein accomplished with either small rotary power sources or hand cranking mechanisms to provide a completely new and different hand operated or electrically powered hand tool.

It is therefore an object of applicant's invention to provide a new and unique crimping tool to aid in the installation of feeder to tap ducts into main duct lines.

It is a further object of applicant's invention to provide a sheet metal crimping tool including a pair of roll form members with means for connecting the same to a source of rotary power such that the movement of the roll forms will provide a clenching operation to seal a tap duct to a main duct.

It is a further object of applicant's invention to provide a duct crimping tool or the like including a pair of shiftable roll members which shifting will permit the placement of the tool over duct flanges such that an internal flange forming operation may be performed to connect a tap duct to a main duct.

These and other objects and advantages of my invention will more fully appear from the following description made in connection with the accompanying drawings, wherein like reference characters refer to the same or similar parts throughout the several views, and in which:

FIG. 1 is a partial vertical elevation of a duct crimper employing the concepts of applicant's invention with sections thereof broken away and installed in a typical tap duct;

FIG. 2 is a view similar to FIG. 1 illustrating the unit in flange forming position;

FIG. 3 is a horizontal section taken substantially along line 3—3 of FIG. 2;

FIG. 4 is a section taken substantially along line 4—4 of FIG. 2.

In accordance with the accompanying drawings the roll crimping tool generally designated 10 is illustrated in operative position to crimp flanges of a center tap duct D into a main duct M. The duct D is ordinarily found with a first flange F for position resting against the side of the duct M and a second flange E which extends into the main duct M and which is clenched over onto the duct wall to positively secure the ducts together.

The crimper 10 in the form shown includes a bifurcated closure section consisting of a first leg member 11 designed to fit into the duct D and a second leg member 12 designed to fit exteriorly of duct D thereby defining a duct receiving longitudinally extending passage therebetween. The length of these legs 11 and 12 is determined in accordance with the standard length of a tap duct D. Leg members 11–12 are joined through a common yoke section 14 which in the form shown extends upwardly to provide a housing and clamping unit 15 such that a source of rotary power such as an electric drill 16 may be received and clamped therein. The chuck 17 of the drill is received into a gear train cavity 18 formed within the yoke section 14. If a hand operated tool is desired a crank member would be utilized in place of the chuck 17.

The configuration of the yoke 14 and leg sections 11–12 in the form shown is a channel shape such that a cavity 11a–12a is provided longitudinally of the leg sections to permit articles to extend from the upper most section thereof to the bottom roll forming end thereof.

A plurality of drive gears 20 are arranged within the gear train cavity 18 and in the form shown four such gears are provided to not only span the distance between the leg cavities 11a–12a but to provide a directional change for drive members 21–22 extending downwardly through the legs to the roll forming section. A plate member 23 may be provided for mounting the gears thereon.

Drive shaft member 21 extends from one of said gears downwardly the entire longitudinal length of leg 11 to a bearing aperture 24 formed in said leg. A conical spur gear 25 is attached to said drive member 21 for rotation therewith to drive a removeable roll form section generally designated 26, said roll form section 26 including a first housing member 27 pivotally mounted through pin 28 to leg 11 and includes therein a bearingly mounted rotatable shaft member 29 having a spur gear 30 securely attached thereto. Spur gear 30 is arranged for driving engagement with conical gear 25 when the housing 26 is shifted into closed position. A female roll form member 31 is provided externally of the housing 26 for rotation with driven shaft 29 and includes a peripheral surface defining a pair of forming surfaces including a first surface 32 for engagement with flange E and a second surface 33 at right angles to said first surface to provide a right angle bend in flange E.

A lever member including an actuating rod 35 having a longitudinal adjustment member 36 therein is pivotally mounted at its lower end to housing 26 and has its upper end 35a pivotally attached to a rotatable lever and actuating handle 37. Handle member 37 is pivotally mounted through pin 37a between the side elements of leg 11. Two stop members 38–39 are provided to prevent over shifting of the lever 37. Lever 37 and actuator rod 35 coaction provides an over center relationship such that when the lever 37 is shifted into the position illustrated in FIG. 2 a positive locking force is obtained to hold the gear members 25–30 in locked driving relation.

Arranged in opposed relationship to form member 31 a second male forming member 40 is provided mounted in rotatable relation on the lower most end of leg 12. In the form shown this male member includes a first surface 41 arranged to abut with the upper most side of flange F and second surface 42 offset at right angles thereto to engage with the wall of duct D thus forming a corner engaging configuration. A spur gear 43 is arranged in driving relation to male form member 40 and is likewise arranged in driven relation to a conical spur gear 42 arranged on the lower most end of drive shaft 22. Again a bearing passage 45 may be provided in the lower most end of leg 12 to positively support shaft 22.

The unit as described provides a pair of rolling forming members 31–40 in closely spaced relation, to form flanges E of center tap ducts therebetween. A first closure force for bringing the roll forms 31–40 into forming relation is provided by the action of lever 37 and thereafter a rolling forming force is supplied by the driven gear members and associated shafts. As the roll members 31–40 rotate in opposite directions they are driven along the flange length to bend the same and form a positive seal entirely therealong. Naturally the aspect of the opposite rotation of the forming members is to propel the tool along the flange and this could be accomplished through various sources of rotary power including hand operated cranks.

It should be obvious that applicant has provided a new and unique and improved crimping device which eliminates the usual hand peening operations ordinarily required to unite center tap ducts to main ducts which will therefore reduce the cost of such installations while providing a connection between ducts which is positive and secure along the entire length thereof.

It will, of course, be understood that various changes may be made in the form, details, arrangements and proportion of parts without departing from the scope of my invention, which generally stated consists in the matter set forth in the appended claims.

What is claimed is:

1. A portable tool for rolling flanges of heating and ventilating ducts including:
   (a) a pair of form members, one of said members arranged in backing relation to the other of said members to permit a duct flange element to be formed therebetween;
   (b) means for shifting at least one of said form members into and out of forming relation permitting the tool to be placed over a duct;
   (c) a bifurcated support member with leg sections spaced a predetermined distance to afford insertion of a sheet metal duct therebetween, said form members being arranged respectively on the ends of said leg sections; and
   (d) means for rotating said form members in opposed rotation to drive the same along a duct flange and form the same therebetween.

2. The structure set forth in claim 1 wherein said pair of form members include generally arcuate forming members, one of said members having a peripheral surface to be received into a right angled corner, the other of said form members having a peripheral surface to receive a right angled corner therein to form metal placed therebetween into a right angled configuration.

3. The structure set forth in claim 1 wherein the legs of said bifurcated support section are generally hollow to receive drive shafts therein for rotatably driving said form members.

4. The structure set forth in claim 3 wherein said means for rotating said form members includes a gear train system for rotating said drive shafts in opposite directions.

5. The structure set forth in claim 4 and means for connecting a source of rotary power to said gear train.

6. The structure set forth in claim 1 and one of said form members being arranged in a housing which housing is pivotally carried by said support means and wherein said shifting means includes a lever member arranged to actuate and shift said housing into and out of forming relation with the other of said forming members.

7. The structure set forth in claim 6 wherein said lever is arranged to shift said housing through an over center position whereby said housing member and form member may be locked in forming position through shifting of said lever.

References Cited
UNITED STATES PATENTS

| 1,668,298 | 5/1928 | Yoder | 113—58 |
| 2,015,804 | 10/1935 | McGarry | 113—54 |
| 3,015,293 | 1/1962 | Parham | 113—58 |
| 3,330,147 | 7/1967 | Wieters | 72—409 |

RICHARD J. HERBST, *Primary Examiner.*